US007508817B2

(12) United States Patent
Huang et al.

(10) Patent No.: US 7,508,817 B2
(45) Date of Patent: Mar. 24, 2009

(54) METHOD AND APPARATUS FOR MEASURING DATA TRANSPORT QUALITY OVER AN INTERNET PROTOCOL

(75) Inventors: Alexander Lisheng Huang, Austin, TX (US); Michael Taylor, Leander, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 573 days.

(21) Appl. No.: 11/053,221

(22) Filed: Feb. 8, 2005

(65) Prior Publication Data

US 2006/0187824 A1  Aug. 24, 2006

(51) Int. Cl.
*H04L 12/66* (2006.01)
(52) U.S. Cl. ............ 370/352; 370/251; 370/252
(58) Field of Classification Search .......... None
See application file for complete search history.

(56) References Cited

U.S. PATENT DOCUMENTS

| | | | |
|---|---|---|---|
| 6,363,065 B1 | 3/2002 | Thornton et al. | |
| 6,452,915 B1 | 9/2002 | Jorgensen | |
| 6,477,492 B1 | 11/2002 | Connor | |
| 6,498,791 B2 | 12/2002 | Pickett et al. | |
| 6,553,515 B1 | 4/2003 | Gross et al. | |
| 6,611,867 B1 | 8/2003 | Bowman-Amuah | |
| 6,650,869 B2 | 11/2003 | Kelly et al. | |
| 6,654,914 B1 | 11/2003 | Kaffine et al. | |
| 6,674,852 B1 | 1/2004 | Hamilton | |
| 6,687,251 B1 | 2/2004 | Mousseau et al. | |
| 6,700,953 B1 | 3/2004 | Maurer et al. | |
| 6,704,287 B1 | 3/2004 | Moharram | |
| 6,704,864 B1 | 3/2004 | Philyaw | |
| 6,781,959 B1 | 8/2004 | Garakani et al. | |
| 6,801,613 B1 | 10/2004 | Hamilton | |
| 6,823,390 B1 | 11/2004 | Bauwens et al. | |
| 6,829,348 B1 | 12/2004 | Schroeder et al. | |
| 6,882,653 B1 * | 4/2005 | Kiuchi et al. | 370/401 |
| 6,914,900 B1 * | 7/2005 | Komatsu et al. | 370/356 |
| 6,940,849 B2 * | 9/2005 | Eichen et al. | 370/352 |
| 6,967,958 B2 * | 11/2005 | Ono et al. | 370/401 |
| 7,130,273 B2 * | 10/2006 | Baj | 370/242 |
| 7,154,533 B2 * | 12/2006 | Sheldon et al. | 348/192 |
| 7,194,535 B2 * | 3/2007 | Hannel et al. | 709/224 |
| 7,302,474 B2 * | 11/2007 | Szucs et al. | 709/217 |
| 2003/0053419 A1 * | 3/2003 | Kanazawa et al. | 370/252 |
| 2005/0021777 A1 * | 1/2005 | Nakao et al. | 709/228 |
| 2005/0286436 A1 * | 12/2005 | Flask | 370/252 |
| 2006/0067215 A1 * | 3/2006 | Elliott et al. | 370/230 |
| 2006/0077963 A1 * | 4/2006 | Li et al. | 370/352 |
| 2006/0190594 A1 * | 8/2006 | Jorgenson et al. | 709/224 |

FOREIGN PATENT DOCUMENTS

| | | |
|---|---|---|
| JP | 2002335327 A | 11/2002 |
| JP | 2003333104 A | 11/2003 |

* cited by examiner

*Primary Examiner*—Phirin Sam
(74) *Attorney, Agent, or Firm*—Akerman Senterfitt; Ed Guntin

(57) ABSTRACT

An IP (Internet Protocol) diagnostic system is provided for troubleshooting data transport quality over an Internet Protocol operating in a communication system (100). The IP diagnostic system includes one or more processors (106) each placed at different segments (108) in the communication system. Each processor is programmed to receive (206) a request to establish a test session with a corresponding test node, establish (208) one or more IP connections with the test node, carry out (210) the test session with the test node on said IP connections, and measure (212) a quality level for each of said IP connections.

18 Claims, 2 Drawing Sheets

METHOD AND APPARATUS FOR MEASURING DATA TRANSPORT QUALITY OVER AN INTERNET PROTOCOL

FIELD OF THE INVENTION

This invention relates generally to IP (Internet Protocol) data applications, and more particularly to a method and apparatus for measuring data transport quality over an Internet Protocol.

BACKGROUND OF THE INVENTION

In an IP network managed by a service provider, troubleshooting may be needed under circumstances where a consumer experiences an issue with transport of IP data between, for example, a VoIP (Voice over IP) terminal unit of the consumer and a destination VoIP terminal unit, or gateway to circuit-switched telephony network. Currently in IP networks such as this, service providers have no substantive means to readily diagnose the source(s) of the transport quality problem. Moreover, the user terminal equipment units provide no such means either.

SUMMARY OF THE INVENTION

Embodiments in accordance with the invention provide a method and apparatus for measuring data transport quality over an Internet Protocol.

In a first embodiment of the present invention, an IP (Internet Protocol) diagnostic system is provided for measuring data transport quality over an Internet Protocol operating in a communication system. The IP diagnostic system includes one or more processors placed at different segments in the communication system. Each processor is programmed to receive a request to establish a test session with a corresponding test node, establish one or more IP connections with the test node, carry out the test session with the test node on said IP connections, and measure a quality level for each of said IP connections.

In a second embodiment of the present invention, a computer-readable storage medium is provided for measuring data transport quality over an Internet Protocol (IP) operating in a communication system. The storage medium has computer instructions for receiving a request to establish a test session with a corresponding test node, establishing one or more IP connections with the test node, carrying out the test session with the test node on said IP connections, and measuring a quality level for each of said IP connections.

In a third embodiment of the present invention, an IP server is coupled to a plurality of processors placed at different segments in a communication system. The IP server operates in a computer-readable storage medium and serves to manage measure data transport quality over an Internet Protocol (IP) operating in the communication system. The storage medium has computer instructions for presenting a calling party with a selection of test options, each test option comprising a test session at a corresponding test node, and receiving from the calling party a selection of one or more of the test options. For each test option, the storage medium further includes instructions for submitting a request to a corresponding one of the processors to establish a test session at a corresponding test node, establish one or more IP connections with the test node, carry out the test session with the test node on said IP connections, and measure a quality level for each of said IP connections. The storage medium further has instructions for reporting to said calling party of the quality level of each IP connection, and repeating the foregoing steps as needed to diagnose transport quality from the calling party to a destination party.

In a fourth embodiment of the present invention, a method is provided for measuring data transport quality over an Internet Protocol operating in a communication system. The method includes steps for presenting a selection of test options, each test option comprising a test session at a corresponding test node, selecting one or more of the test options, for each test option, and submitting a request to a corresponding one of a plurality of processors at different segments of the communication system. From the corresponding one of the processors, the method further includes steps for establishing a test session at a corresponding test node, establishing one or more IP connections with the test node, carrying out the test session with the test node on said IP connections, and measuring a quality level for each of said IP connections. The method further includes steps for presenting the quality level of each IP connection, and repeating the foregoing steps as needed to diagnose transport quality from the calling party to a destination party.

DETAILED DESCRIPTION OF THE DRAWINGS

Figure 1:
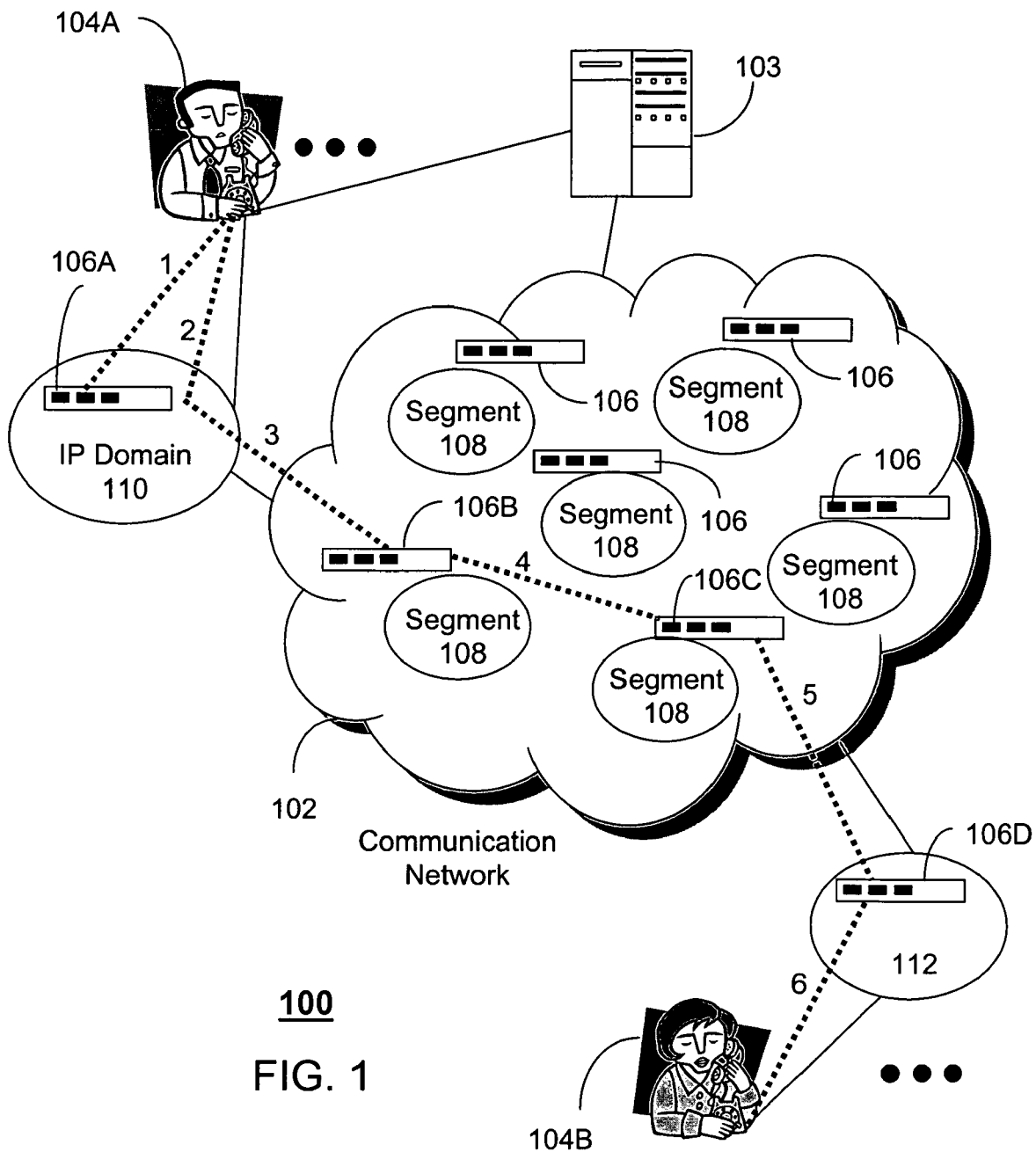
FIG. 1 is a block diagram of a communication system for measuring data transport quality in an IP network managed by a service provider according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is a block diagram of a communication system 100 for measuring data transport quality in an IP network managed by a service provider according to an embodiment of the present invention. The communication system 100 comprises in part a conventional packet-switched communication network 102 consisting of a number of segments 108. A segment 108 can be any local or long distance conventional communication device that can support Internet Protocol (IP) traffic. For example, a segment 108 can be an ISP (Internet Service Provider), a wired or wireless Internet router, dedicated lines of a PSTN (Public Switched Telephone Network), an IP gateway interfacing to a PSTN segment, or like communication means for carrying IP traffic. These segments 108 partition the communication network 102 and they can be as small as a single physical device or as large as to cover an expansive geographic region such as a City, State, region, or country.

In the illustration of FIG. 1, the communication network 102 can be coupled to homes or offices. In the case of a home, the communication network 102 can be coupled to a consumer by way of a conventional analog PSTN 112 line, DSL (Digital Subscriber Line), or digital cable. A large or small business can have its own Intranet, which provides for self-management of an IP domain 110. In the foregoing environment, the consumers shown in FIG. 1 with reference numbers 104A-B, respectively, are assumed to be utilizing IP terminal units, or a hybrid of an IP terminal unit at one end and a conventional PSTN telephone at the other end.

IP terminal units 104A-B can be, for example, VoIP (Voice over IP) telephones, or other IP media devices designed for exchanging between parties voice messages, voice and image messages, and/or other forms of data messages such as music, video, still pictures, streaming data, or other similar IP data. These embodiments and further evolutions of said IP terminal units are considered to be within the scope and spirit of the claims described herein for diagnosing end-to-end transport quality issues. A conventional IP gateway can be used to interconnect an IP telephone and an analog telephone.

There are times when data messaging over the service provider's IP network can result in poor quality transport of said messages. Sources for poor message quality can be attributed to interruptions in packet flow such as, for example, lost packets, jitter, echo, and packet delays, just to name a few. The present invention supplements the communication system 100 of FIG. 1 with the addition of an IP diagnostic system to overcome these limitations. The IP diagnostic system comprises a number of processors 106 placed at different segments 108 in the communication system 100 as shown in FIG. 1. In the present illustration, it is assumed the service provider of the IP diagnostic system has the right to place processors 106 in many locations including a customer's premises if so allowed as shown with processor 106A and 106D. The number of processors 106 and placement thereof in the communication system 100 can be more or less than shown in FIG. 1, and can depend on the ownership rights and/or partnerships established by the service provider to manage portions of said communication system 100.

Each processor 106 utilizes conventional computing technology such as a microprocessor, DSP (Digital Signal Processor), or other computing devices singly or in combination coupled to storage media such as RAM (Random Access Memory) and/or a hard disk. The IP diagnostic system provides a means to measure data transport quality over an Internet Protocol such as RTP (Real-time Transport Protocol). As a supplemental embodiment, an IP server 103 can be used to manage the processors 106 of the IP diagnostic system, and for providing conventional connectivity services (e.g., SIP—Session Initiation Protocol, MGCP—Media Gateway Control Protocol, or other like signaling technology) to users of IP terminal units 104 for establishing end-to-end connections. Said IP server 103 can utilize similar or more sophisticated conventional computing technology as described for the processors 106.

Figure 2:
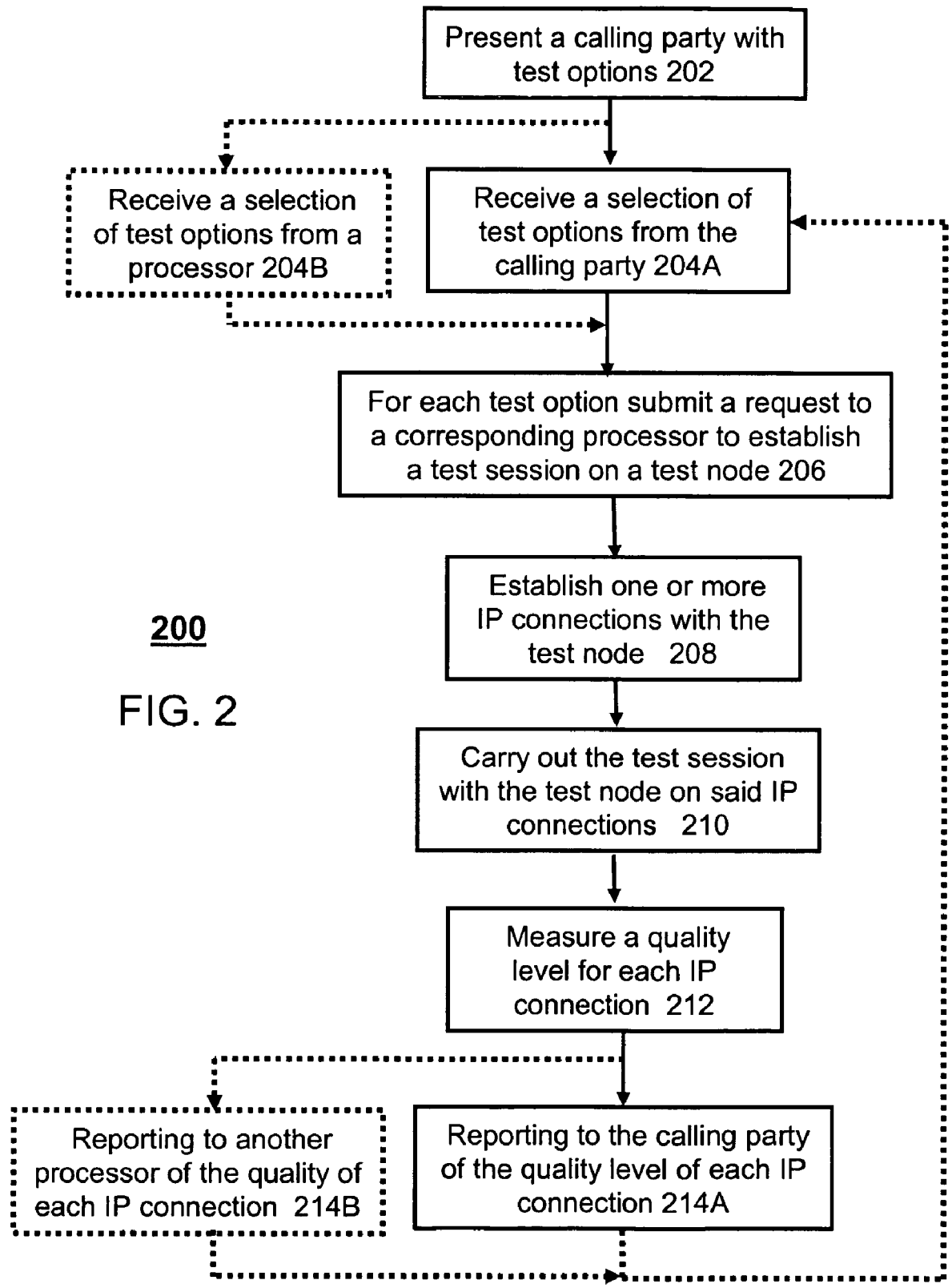
FIG. 2 depicts a flow chart of a method operating in said communication system according to an embodiment of the present invention.

FIG. 2 depicts a flow chart of a method 200 operating in said communication system 100 according to an embodiment of the present invention. In the present illustration it is assumed method 200 is triggered when a calling party utilizing an IP terminal unit such as 104A of FIG. 1 experiences communication issues (such as poor audio and/or video quality, dropped connections, etc.) with a destination IP terminal unit 104B of another party. It will be appreciated that alternatively method 200 can be applied in a case where the destination is an analog telephone 104B. In this instance, a conventional IP gateway (serving as one of the segments 108 of the communication network 102) near the destination party would be utilized to translate the packets sent by IP unit 104A to signals understood by the analog telephone 104B. For the illustration that follows, however, it will be assumed the destination utilizes an IP terminal unit 104B as described above.

Under these circumstances, method 200 begins with step 202 where the calling party of IP terminal unit 104A is presented with a selection of test options from the IP server 103. Each test option comprises a test session at a corresponding test node. A test node in this context can be represented by one of the processors 106, and/or the IP terminal unit 104A of said calling party. The presentation step 202 can be triggered by the calling party accessing a known website managed by the IP server 103, which has an understanding of the topology and capabilities of each segment 108 in the communication network 102. The contents of said web site can be presented graphically on a computer screen available to the calling party or the IP terminal unit 104A of said party if such unit has a reasonably sized display.

The graphical presentation can, for example, show a number of test nodes that can be linked together throughout the communication system 100 in whole or in part so as to provide the calling party a means to diagnose the communication issues experience by said caller. Alternatively, the presentation step 202 can be provided audibly by way of interactive voice menus provided to the IP terminal unit 104A, or other conventional communication means. In this latter embodiment, the IP server 103 can operate with a convention IVR (Interactive Voice Response) system (not shown) for providing a voice interactive function in accordance with method 200.

Any one of the foregoing presentations methods provides the calling party an overview of possible test options. The test options can be driven in part by the geographic locations of the IP terminal unit 104A of the calling party and the IP terminal unit 104B of the destination party, respectively. Said locations can be determined automatically by the IP server 103 from the caller ID of said calling party and the number dialed, URL, domain name or IP address of the destination party. Alternatively, said information can be provided by the calling party by way of the IVR system of the IP server 103. The location of said IP terminal units 104A-B in turn can be used by the IP server 103 to map a proposed diagnostic strategy for one or more processors 106 to isolate the segment (s) 108 in the communication system 100, which may be degrading IP data transport quality in the end-to-end connection. This mapping can be provided visually by way of graphics and/or text on a computer of the calling party, or the IP terminal unit 104A of said party.

In step 204A, the IP server 103 receives from the calling party a selection of one or more of the test options. In step 206, the IP server 103 submits a request for each test option to a corresponding one or more of the processors 106 to establish a test session on a test node. The reader's attention is directed to FIG. 1, which illustrates a possible test option corresponding to step 206. In this illustration, the calling party selects a test option, which establishes a test session between the IP terminal unit 104A and the nearest processor 106A. The IP terminal unit 104A in this illustration embodies the test node to be operated on by processor 106A. After receiving the request for a test session, processor 106A establishes one or more IP connections (see link 1 illustrated as a dashed line) with the IP terminal unit 104A in step 208. In steps 210-212 processor 106A carries out the test session with the IP terminal unit 104A on said IP connections and measures a quality level for each of said IP connections.

The test session entails the exchange of test packets between the processor 106A and the IP terminal unit 104A. The extent and complexity of the testing can vary upon the topology of segments 108 known to the selected processor 106. Accordingly, the test packets can carry anything from pilot or multi-tone signals, canned or live voice messages, pseudorandom sequences, video combined with audio, or other suitable test data. During a test session, the processor 106A can instruct the IP terminal unit 104A to prevent insertion of data signals such as voice and/or video on the one or more IP connections during execution of the test session. Said test packets can operate on a conventional Real-time Transport Protocol (RTP). RTP provides services such as payload type identification, sequence numbering, time-stamping, and delivery monitoring to real-time applications, and is designed to provide end-to-end network transport functions for applications transmitting real-time data, such as audio, and/or video.

The quality level of an IP connection can be measured in whole or in part according to any one or more convention metrics such as delay, jitter, packet loss, echo (such as, for example, echo return loss), audio clarity (as a function, for example, of MOS—Mean Opinion Score), and Perceptual Evaluation of Speech Quality (PESQ). Any of these (or other) conventional measurement techniques in whole or in part can be used by the present invention to measure the quality of signals transported by IP connections. For example, PESQ (Perceptual Evaluation of Speech Quality) is an objective method defined by the International Telecommunication Union (ITU—see www.itu.org) that can be used for end-to-end speech quality assessment of speech codecs. All present and future public references, definitions, and specifications for PESQ as described by the ITU-T recommendations P.862 and P.862.1 are incorporated by reference herein.

This and other conventional quality measurement techniques can be used in the present invention to measure the quality level for data exchanged between said IP terminal units 104A-B across one or more segments 108 of the communication network 102. The quality level derived from these tests can in turn be translated, for example, into a quality score of 1 to 5 (5 being best quality, 1 being poorest quality) that gives the calling party a quantitative, and/or qualitative understanding of the quality of messages transported on a tested IP connection between processors 106 on corresponding segments 108. In step 214, the calling party is reported of the quality level (or score) of each IP connection. Depending on the results of the foregoing steps, the calling party can choose to select additional test options to further diagnostic testing in steps 204A-214A.

For example, the calling party might discover that the IP connection between the IP terminal unit 104A and processor 106A (see link 1) has no issues based on the quality score provided by the IP server 103. Under these circumstances the calling party can submit a second request to establish a second test session on a second test node such as, for example, a test session linking processor 106A, IP terminal unit 104A, and processor 106B (see links 1-3). If on this second test cycle the calling party discovers no quality issues, the calling party can continue to augment the scope of testing until such time a processor 106D nearest to IP terminal unit 104B of the destination party (see links 4-6) has been called on for testing segments 108 between said units 104A-B.

Based on the sophistication of the IP terminal unit 104A of the calling party, the addition of processors 106B-D may or may not require user intervention by the calling party of said IP terminal unit 104A during the above test sessions. For example, the IP terminal unit 104A can have the sophistication to accept and respond to an instruction from IP server 103 to conference one or more processors 106B-D over one or more IP connections. Once the processors 106 and the IP terminal unit 104A have been linked, the IP terminal unit 104A can also partake in the test session in coordination with the other processor(s) 106 by executing any one of the above testing techniques in whole or in part if such technology is available in the IP terminal unit 104A. If on the other hand, the IP terminal unit 104A is not sophisticated enough to respond to a conferencing request from a processor 106, then the instruction from the IP server 103 can come in the form of a voice message to the calling party requesting that said party perform the conferencing function by, for example, depressing one or more buttons on the IP terminal unit 104A for multiparty conferencing.

Referring back to method 200, it should be evident to the reader by now that said method can be altered while maintaining consistency with the scope and spirit of the claims described below. For example, steps 204A and 214A can be replaced with steps 204B and 214B, respectively. That is, the request for a test option at a processor 106 can come from another processor 106 in place of a calling party or the IP server 103. Similarly, the IP server 103 can report to a processor 106 of the quality of the IP connections tested instead of reporting to a calling party.

Alternatively, a hybrid of said steps are also possible. That is, more than one test option request can be submitted by one or more processor(s) 106 and the calling party in sequence or contemporaneously, and the results of the quality measured on the IP connections associated with said test options can be provided in whole or in part to the processors 106 and the IP terminal unit 104A of the calling party. In a supplemental embodiment, the processors 106 can be programmed to report in step 214 to other processors 106 and/or the calling party when the quality level of each of the IP connections has fallen below a predetermined threshold. The predetermined threshold can be, for example, a quality score set by the service provider of the IP diagnostic system.

It should also be evident that the calling party is not limited to a customer of the service provider. A calling party as referred to above can also be an employee of the service provider of the IP diagnostic system. Moreover, method 200 can operate with multiple calling parties. For example, the user of IP terminal unit 104A may be one calling party working in coordination with another calling party, wherein one of the calling parties can be represented by an employee of the IP diagnostic system assisting said caller in measuring the transport quality of the end-to-end connection between the IP terminal units 104A-B. Additionally, the employee's participation can be called on by the end user of IP terminal unit 104A, or automatically by one of said processors 106 which can invoke a conventional alarm state with the service provider which is detectable by an employee when a quality level is detected below the predetermined threshold.

It should be further evident that method 200 can support diagnostic testing by way of the processors 106 and an IP terminal unit 104 without assistance of the IP server 103. For example, as IP terminal units 104 evolve in sophistication they may be able to sense deterioration in IP connections over the course of use by an end user of said IP terminal unit 104. As such, the IP terminal unit 104 can invoke a request to one or more processors 106 without intervention by the end user to establish test sessions on IP connections commonly used by the end user. Similarly, the processors 106 can from time to time autonomously monitor the quality level of IP connections of an end user of the IP terminal unit 104 by establishing test sessions on IP connections commonly observed to be used by end users of IP terminal units. These latter embodiments provide for a preemptive (self-healing) strategy to maintain a high quality level of service throughout the communication system 100.

It should be clear to the reader that the present invention can be realized in hardware, software, or a combination of hardware and software. Moreover, the present invention can be realized in a centralized fashion, or in a distributed fashion where different elements are spread across several interconnected processors. Any kind of computer device or other apparatus adapted for carrying out method 200 described above is suited.

Additionally, the present invention can be embedded in a computer program product, which comprises all the features enabling the implementation of method 200, and which when loaded in a computer system is able to carry out these methods as computer instructions. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

It should be also evident that the present invention may be used for many applications. Thus, although the description is made for particular arrangements and methods, the intent and concept of the invention is suitable and applicable to other arrangements and applications not described herein. For example, as described above the present invention is operable without the use of the IP server 103. Thus, in a distributed environment the processors 106 can be programmed to perform the functions of said IP server 103, and interact among themselves and with one or more calling parties as described in method 200. From the innumerable embodiments possible, it would be clear therefore to those skilled in the art that modifications to the disclosed embodiments described herein can be effected without departing from the spirit and scope of the invention.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. An IP (Internet Protocol) diagnostic system for measuring data transport quality over an Internet Protocol operating in a communication system, comprising:
   one or more processors each placed at different segments in the communication system, wherein each of said processors is programmed to:
   receive a request to establish a test session with a corresponding test node;
   establish one or more IP connections with the test node;
   carry out the test session with the test node on said IP connections; and
   measure a quality level for each of said IP connections, wherein the quality level is measured according to at least one of a group of metrics comprising delay, jitter, packet loss, echo, audio clarity, and Perceptual Evaluation of Speech Quality, wherein the test node is a IP terminal unit, and wherein the processor is further programmed to instruct the IP terminal unit to Prevent insertion of data signals therefrom on the one or more IP connections during execution of the test session.

2. The IP diagnostic system of claim 1, wherein said test node is one or more of a group comprising the IP terminal unit and one or more of the other processors.

3. The IP diagnostic system of claim 1, wherein the test session comprises exchanging test packets between the processor and the test node.

4. The IP diagnostic system of claim 3, wherein said test packets are audio packets, and wherein said audio packets operate on a Real-time Transport Protocol.

5. The IP diagnostic system of claim 1, wherein the processor is further programmed to instruct the IP terminal unit to conference the processor with one or more of the other processors over the one or more IP connections.

6. The IP diagnostic system of claim 1, wherein said processor is further programmed to:
   receive one or more test packets from the IP terminal unit over one of said IP connections; and
   determine in part from said test packets the quality level of said IP connection.

7. The IP diagnostic system of claim 1, wherein the request is from one of a group of sources comprising a calling party and another of said processors.

8. The IP diagnostic system of claim 7, wherein said processor is further programmed to report to one or more of the group of sources the quality level of each IP connection when said quality level falls below a predetermined threshold.

9. The IP diagnostic system of claim 7, wherein said processor is further programmed to:
   receive a second request from one or more of the group of sources to establish a second test session on a second test node; and
   repeat the foregoing steps for the second test session on the second test node.

10. A computer-readable storage medium for measuring data transport quality over an Internet Protocol (IP) operating in a communication system, the storage medium comprising computer instructions, which when executed by a processor, cause the processor to perform:
    receiving a request to establish a test session with a corresponding test node;
    establishing one or more IP connections with the test node;
    carrying out the test session with the test node on said IP connections;
    measuring a quality level for each of said IP connections, wherein the quality level is measured according to at least one of a group of metrics comprising delay, jitter, packet loss, echo, audio clarity, and Perceptual Evaluation of Speech Quality; and
    instructing the test node to prevent insertion of data signals therefrom on the one or more IP connections during execution of the test session.

11. The storage medium of claim 10, wherein said test node is one or more of a group comprising an IP terminal unit and one or more of the other processors.

12. The storage medium of claim 10, wherein the test session comprises exchanging test packets between the processor and the test node.

13. The storage medium of claim 10, wherein said test packets are audio packets operating on a Real-time Transport Protocol.

14. The storage medium of claim 10, wherein the test node is a IP terminal unit and one or more of the other processors, and wherein the storage medium further comprises computer instructions for instructing the IP terminal unit to conference the processor with one or more of the other processors over the one or more IP connections.

15. The storage medium of claim 10, wherein the request is from one of a group of sources comprising a calling party and another of said processors, and wherein said storage medium further comprises computer instructions for reporting to one or more of the group of sources the quality level of each IP connection when said quality level falls below a predetermined threshold.

16. The storage medium of claim 10, wherein the request is from one of a group of sources comprising a calling party and another of said processors, and wherein said storage medium further comprises computer instructions for:
  receiving a second request from one or more of the group of sources to establish a second test session on a second test node; and
  repeating the foregoing steps for the second test session on the second test node.

17. An IP server coupled to a plurality of processors placed at different segments in a communication system, wherein said IP server operates in a computer-readable storage medium and serves to measure data transport quality over an Internet Protocol (IP) operating in the communication system, the storage medium comprising computer instructions, which when executed by a processor, cause the processor to perform:
  presenting a calling party with a selection of test options, each test option comprising a test session at a corresponding test node;
  receiving from the calling party a selection of one or more of the test options;
  for each test option, submitting a request to a corresponding one of the processors to:
    establish a test session at a corresponding test node;
    establish one or more IP connections with the test node;
    carry out the test session with the test node on said IP connections;
    measure a quality level for each of said IP connections;
  reporting to said calling party of the quality level of each IP connection;
  repeating the foregoing steps as needed to diagnose transport quality from the calling party to a destination party; and
  instructing the test node to prevent insertion of data signals therefrom on the one or more IP connections during execution of the test session.

18. A method for measuring data transport quality over an Internet Protocol operating in a communication system, comprising:
  presenting a selection of test options, each test option comprising a test session at a corresponding test node;
  selecting one or more of the test options;
  for each test option, submitting a request to a corresponding one of a plurality of processors at different segments of the communication system;
  from the corresponding one of the processors, establishing a test session at a corresponding test node, establishing one or more IP connections with the test node, carrying out the test session with the test node on said IP connections, and
  measuring a quality level for each of said IP connections;
  reporting the quality level of each IP connection;
  repeating the foregoing steps as needed to diagnose transport quality from the calling party to a destination party; and
  instructing the test node to prevent insertion of data signals therefrom on the one or more IP connections during execution of the test session.

* * * * *